Figure 1:
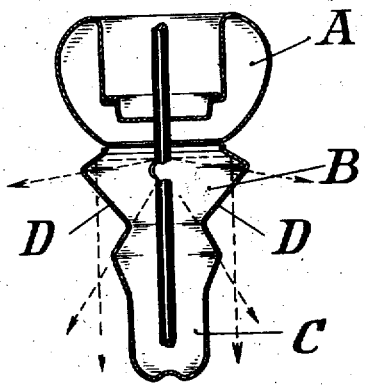
Figure 2:
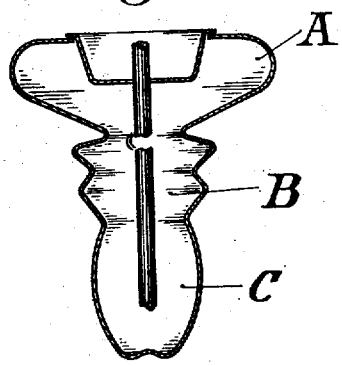
Figure 3:
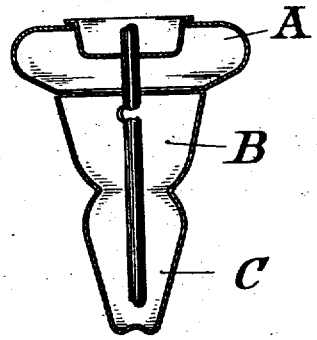
Figure 4:
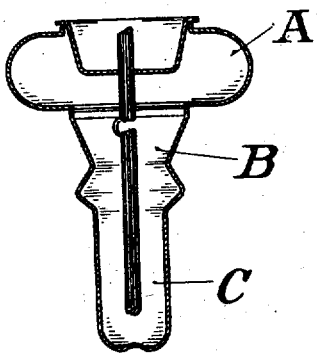

T. L. CARBONE.

ARC LAMP.

APPLICATION FILED FEB. 19, 1913.

Reissued Sept. 23, 1913. 13,618.

Witnesses
F. Fisk
J. H. Niles

Inventor
Tito Livio Carbone,
by Cooper & Gaupel,
Attorneys

UNITED STATES PATENT OFFICE.

TITO LIVIO CARBONE, OF CHARLOTTENBURG, GERMANY.

ARC-LAMP.

13,618. Specification of Reissued Letters Patent. Reissued Sept. 23, 1913.

Original No. 975,935, dated November 15, 1910, Serial No. 484,552. Application for reissue filed February 19, 1913. Serial No. 749,536.

DIVISION A.

*To all whom it may concern:*

Be it known that I, TITO LIVIO CARBONE, a citizen of the Swiss Republic, residing at Charlottenburg, near Berlin, Germany, have invented certain new and useful Improvements in Arc-Lamps; and I do hereby declare the following to be a full, clear, and exact description of the invention; such as will enable others skilled in the art to which it appertains to make and use the same.

The present invention relates to arc lamps for long lighting hours and has the object of keeping clean the part of the globe from which the light mainly issues, especially in case of the employment of impregnated carbons.

The use of the flaming arc is connected with the disadvantage of requiring a globe or inclosure for the arc, and the vapors invariably given off by the flaming arc of impregnated or other carbons yield deposits which cloud the transparent walls and tend to obscure the arc. Attempts have been made to overcome this difficulty by utilizing the heat of the arc to set up a vigorous circulation of the gases at the interior of the globe by providing a more or less highly organized exterior circulatory system for the purpose of returning the gases which have been forced out at the top to the bottom of the globe. These gases carry the vapors away from the arc and deposit the condensation-products in the cooler parts of the circulatory system arranged to receive them outside of the arc-inclosing globe itself. In such attempts as have been made to carry out this arrangement, a number of difficulties have been encountered. For instance, some definite construction must be employed for the purpose of returning the gases downwardly from the arc to the lower end of the globe. These channels necessarily obstruct the arc more or less and prevent it from delivering its full illuminating effect, cutting down its efficiency and in some instances casting large shadows. These difficulties are independent of the complexity and elaborate structures that become necessary.

The object of the present invention is to eliminate these difficulties and attain the desired result in a more direct manner and by simpler and less expensive means.

As a result of much testing and experimental work, means were devised whereby the desired result may be accomplished and at the same time the circulatory system much simplified. The necessity of any outside duct or ducts for the return of the gases to the lower portion of the arc-space is dispensed with and the whole structure simplified by reducing the same to a single globe or inclosure which is provided with a plurality of chambers suitably connected. One embodiment of my invention, which has given excellent results, has three such chambers arranged one above the other, the middle chamber being transparent and containing the arc, which chamber, for the best light emitting and distributing qualities, may be conical in shape with the walls preferably brought into more or less proximity to the arc, so as to better subserve the efforts of maintaining its surface free from deposits.

It is thought that the gases rising around the upper electrode are cooled in the upper chamber and fumes deposited therein and that the cooled gases flow along the outer part of the globe adjacent to the wall. The heat adjacent the arc would be sufficient to prevent the deposit of the fumes, but around the lower electrode the flow of gas would be slow enough to permit suspended particles to fall in the lower chamber.

Tests have been conducted with different makes of impregnated arc-carbons with uniform results,—the globe remaining clear for upward of 150 hours, and this with a single trim or supply of carbons. I have found that excellent results are obtained when a depositing space is provided both above and below. It was soon found that when one or both chambers were omitted, the deposit would encroach and would partially obscure the light-emitting wall surrounding the arc. As a means of securing a clear line of demarcation of the deposits and preventing their encroachment upon the transparent wall immediately surrounding the arc, a change of angle or inclination of the wall with respect to the arc or general alinement of electrodes is found effective, and an inner ridge or contraction will accomplish this result. Of course, a clear line of demarcation is not in all cases necessary, and any means of confining, to a greater or less extent, the deposits, will fulfil the conditions,—the necessary feature being an organization whereby the phenomenon of diffusion operates to carry the vapors produced at the arc away from the light-emitting wall before they are condensed and the oxids or other solids deposited.

The present invention consists in providing a separate chamber for the arc by forming a series of circular contractions in the globe, so that it is divided into several superposed chambers. By this device the heat of the arc is concentrated in the middle member, but at the same time the walls of the middle chamber are protected by their conical shape against decomposition and can therefore be arranged closer to the arc than was possible hitherto. The advantage of this arrangement is that no gases are condensed on the walls of the middle chamber inclosing the arc.

Figures 1 to 4 of the accompanying drawings show several different forms of globes according to my invention and it will be understood that the globe may take a great many different forms without departing from the spirit of the invention.

A, B, C are the three chambers inclosed by the contractions in the wall of the globe. These chambers may be made wholly of glass or partly of glass and partly of a suitable metal. It has been found by experiment that, with this arrangement, the condensed gases from the impregnated carbons are deposited only in the upper and lower chambers A and C, while the wall of the chamber B remains free from deposit and therefore transparent.

In Fig. 1 the part of the wall of the globe that is kept free of the condensed gases is marked D.

I claim:

1. An arc-lamp globe specially adapted to the use of impregnated carbons, and divided into a plurality of superposed chambers by a chamber inclosing the arc, said chamber having a wall of a configuration suitable for surrounding the arc closely so as to be heated thereby for preventing the gases produced by the arc from condensing on said wall, the chambers above and below the arc chamber for the deposited condensed gases communicating only through said arc chamber.

2. An arc lamp globe specially adapted to the use of impregnated carbons, and divided into three superposed chambers by suitable contractions in the wall, the middle chamber having the shape of an inverted cone and its walls surrounding the arc as closely as possible to prevent the gases produced by the arc condensing on the walls of said chamber.

3. An arc-lamp globe specially adapted to the use of impregnated carbons, and divided into a plurality of superposed chambers by a chamber inclosing the arc, formed by a series of circular contractions in the globe the walls of the arc chamber surrounding the arc closely so as to be heated for preventing the gases produced by the arc from condensing thereon.

4. In an arc-lamp, a globe or inclosure for use with impregnated or flame-arc carbons, divided into three superposed chambers by suitable contractions in the walls, the middle chamber having a transparent wall surrounding the arc, and a separation or joint at the upper end of the middle chamber between it and the chamber above.

5. In an arc-lamp, a globe or inclosure for use with impregnated or flame-arc carbons, divided into three superposed chambers by suitable contractions in the walls, the middle chamber having a transparent wall surrounding the arc, an upper chamber separated from said middle chamber, and a lower chamber immediately below the transparent wall of the middle chamber and made integral therewith.

6. In an arc-lamp, a globe or inclosure for use with impregnated or flame-arc carbons, divided into three superposed chambers by suitable contractions in the walls, the middle chamber having a transparent wall surrounding the arc, an upper chamber separated from said middle chamber, and a lower chamber immediately below the transparent wall of the middle chamber made integral therewith and closed at the lower end.

7. In an arc-lamp for use with impregnated or flaming arcs, an inclosure for the flaming arc having a space adjacent to the flaming arc heated thereby, the walls of said space having an inclination with respect to the axis of the arc so that said wall is so closely approached to the arc to utilize the same to prevent condensation of the condensable vapors, said inclosure having spaces above and below the arc space, forming with the walls of the inclosure, inclosed condensation spaces.

8. An arc-lamp globe specially adapted to the use of impregnated carbons, and divided into a plurality of superposed chambers by suitable configuration of the walls, the middle chamber inclosing the flame of the arc and having a transparent wall surrounding the arc closely for preventing the gases produced by the arc from condensing on said walls, said configuration of the walls being at the line of demarcation of the deposits, said chambers above and below the arc chamber being freely communicating therewith and communicating only through said arc chamber.

9. An arc-lamp globe specially adapted to the use of impregnated carbons, and divided into a plurality of superposed chambers by suitable configuration of the walls, the walls of the middle chamber surrounding the flame of the arc as closely as possible so as to be heated thereby for preventing the gases produced by the arc from condensing on the walls of the arc inclosing middle chamber, the said walls of the globe consisting partly of glass and partly of metal, said chambers above and below the arc chamber being freely communicating with each other only through said arc-chamber.

10. In an arc lamp specially adapted for the use of impregnated or flaming arcs, a globe divided into three walled spaces, the arc space having a wall surrounding the arc closely so as to be heated for preventing condensation thereon, said spaces communicating with each other only through said arc-space and the walls of said space having changes of configuration at their boundaries for securing a clear line of demarcation of the deposits at said changes.

11. An arc lamp globe or inclosure especially adapted to the use of impregnated carbons, and divided into a plurality of superposed walled spaces by a walled space for the arc, said arc space having a wall with an inverted conical shape surrounding the arc closely so as to be heated for preventing the gases produced by the arc from condensing thereon.

12. An arc lamp globe for use with impregnated or flaming arcs, including a walled space having a wall where the light mainly issues, upwardly inclined with respect to the arc or general alinement of electrodes, surrounding the flaming arc closely so as to be heated for preventing the gases produced by the arc from condensing on said wall.

13. In an arc lamp, having a globe or inclosure for use with impregnated or flaming arcs, a walled space or chamber for the arc having a wall where the light mainly issues of an inverted conical shape, arranged close to the arc so as to be heated for preventing the gases produced by the arc from condensing on said wall.

14. An arc lamp globe specially adapted to the use of impregnated carbons, and divided into a plurality of superposed chambers by a middle chamber inclosing the arc formed by a series of circular contractions in the globe, the wall of the middle chamber having a conical shape and surrounding the arc closely so as to be heated for preventing the gases produced by the arc from condensing thereon.

15. In an arc lamp specially adapted to the use of impregnated carbons, having a globe, a chamber inclosing the arc, formed by a series of circular contractions in the globe, the wall of the arc inclosing chamber having a conical shape and surrounding the arc closely so as to be heated for preventing the gases produced by the arc from condensing thereon.

In testimony that I claim the foregoing as my invention, I have signed my name in presence of two subscribing witnesses.

TITO LIVIO CARBONE.

Witnesses:
C. P. Goepel,
Asher Blum.